US010866195B2

(12) United States Patent
Iler

(10) Patent No.: US 10,866,195 B2
(45) Date of Patent: Dec. 15, 2020

(54) WHEEL INTEGRITY MONITORING SYSTEM

(71) Applicant: CANADIAN NATIONAL RAILWAY COMPANY, Montreal (CA)

(72) Inventor: Darrell Iler, Crown Point, IN (US)

(73) Assignee: Canadian National Railway Company, Montreal (CA)

( * ) Notice: Subject to any disclaimer, the term of this patent is extended or adjusted under 35 U.S.C. 154(b) by 0 days.

(21) Appl. No.: 16/091,912

(22) PCT Filed: Apr. 7, 2017

(86) PCT No.: PCT/US2017/026507
§ 371 (c)(1),
(2) Date: Oct. 5, 2018

(87) PCT Pub. No.: WO2017/177084
PCT Pub. Date: Oct. 12, 2017

(65) Prior Publication Data
US 2019/0094154 A1    Mar. 28, 2019

Related U.S. Application Data

(60) Provisional application No. 62/320,125, filed on Apr. 8, 2016.

(51) Int. Cl.
*G01N 21/95* (2006.01)
*G01B 11/24* (2006.01)
(Continued)

(52) U.S. Cl.
CPC .......... *G01N 21/95* (2013.01); *B61L 27/0094* (2013.01); *G01B 11/00* (2013.01);
(Continued)

(58) Field of Classification Search
CPC ............... G02B 27/48; G02B 19/0014; G02B 19/0085; G02B 19/009; G02B 26/10; G02B 27/095; G02B 19/0052; G02B 19/0095; G02B 6/0055; G02B 5/0242; G02B 5/0294; G02B 6/0035; G02B 6/0065; G02B 6/0018; G02B 6/0038; G02B 6/0045; G02B 6/005; G02B 6/0053; G02B 6/006; G02B 6/0061; G02B 5/12; G02B 5/124; G02B 5/128; G02B 6/0001; G02B 6/0036; G02B 6/0051; G02B 6/0063; G02B 19/0028; G02B 19/0057; G02B 19/0066;
(Continued)

(56) References Cited

U.S. PATENT DOCUMENTS 5,636,026 A  *  6/1997  Mian ........................ B61K 9/12
                                                                    250/224
6,768,551 B2 *  7/2004  Mian ........................ B61K 9/12
                                                                    250/559.23
(Continued)

*Primary Examiner* — Michael P Stafira
(74) *Attorney, Agent, or Firm* — Fish & Richardson P.C.

(57) ABSTRACT

A wheel integrity monitoring system for monitoring the integrity of a railcar wheel in an automated manner while the railcar is in operation (i.e., traveling) and comprising a light source that projects light onto the wheel and a light detector that detects the light reflected by the wheel. The wheel integrity monitoring system is configured to analyze the reflected light to determine if the wheel is defective.

14 Claims, 15 Drawing Sheets

(51) Int. Cl.
*G01B 11/30* (2006.01)
*G01B 11/00* (2006.01)
*G01N 21/952* (2006.01)
*B61L 27/00* (2006.01)

(52) U.S. Cl.
CPC .............. *G01B 11/24* (2013.01); *G01B 11/30* (2013.01); *G01N 21/952* (2013.01)

(58) Field of Classification Search
CPC .. G02B 26/0875; G02B 5/0284; G02B 5/206; G02B 5/26; G02B 6/0095; B61K 9/08; B61K 9/10; B61K 13/04; B61K 9/12; G01J 2001/4242; G01J 2003/1217; G01J 3/02; G01J 3/0202; G01J 3/0208; G01J 3/021; G01J 3/0216; G01J 3/0218; G01J 3/0229; G01J 3/027; G01J 3/0289; G01J 3/06; G01J 3/1804; G01J 3/2846; G01J 3/42; G01J 2005/0033; G01J 2005/0077; G01J 5/0022; G01J 2005/0081; G01J 5/025; G01J 5/04; G01J 5/041; G01J 5/044; G01J 5/0834; G01J 5/62; G01N 27/82; G01N 21/59; G01N 21/645; G01N 21/85; G01N 21/8507; G01N 21/95; G01N 21/952; G01N 2201/062; G01N 2201/12; G01N 2291/044; G01N 2291/101; G01N 2291/2696; G01N 29/041; G01N 29/4463; G01N 33/22; G01N 21/8851; G01N 2291/2623; G01N 2291/0234; G01N 25/72; G01N 27/85; G01N 29/04; G01N 29/14; G01N 29/265; G01N 29/4409; G01N 29/46; G01N 29/50; G01B 11/00; G01B 11/18; G01B 11/24; G01B 11/245; G01B 11/25; G01B 11/2513; G01B 11/2527; G01B 11/30; G01B 11/2518; G01B 11/2545; G01M 5/0033

See application file for complete search history.

(56) References Cited

U.S. PATENT DOCUMENTS 6,862,936 B2 * 3/2005 Kenderian ............ G01M 17/10 73/636
9,211,879 B2 * 12/2015 Leitel .................... B60T 8/1893

* cited by examiner

WHEEL INTEGRITY MONITORING SYSTEM

FIELD

The present disclosure generally relates to wheel structures, and in particular to inspection of wheel structures for assessing their structural integrity.

BACKGROUND

There are many applications that require a periodic assessment of the structural integrity of wheels used in different types of equipment. As an example, in the rail industry, wheel integrity is critical to the safe operation of a train and therefore it is important to assess the integrity of the wheels of a train at periodic intervals.

The most common type of failure of a wheel occurs when a portion of the wheel chips away. This type of failure is not necessarily immediately catastrophic (i.e., does not necessarily cause a complete collapse of the wheel). However it can weaken the wheel as stresses concentrate at the area where material has separated from the wheel.

Traditionally, wheel integrity has been assessed through a visual inspection of the wheels performed by a human inspector. However, such a manual process is time-consuming, expensive and, moreover, cannot be performed while the train is in operation (i.e., can only be performed while the train is immobilized).

For these and/or other reasons, there is a need for improvements directed to wheel integrity assessment.

SUMMARY

In accordance with various aspects of the invention, there is provided a wheel integrity monitoring system for monitoring the integrity of a railcar wheel in an automated manner while the railcar is in operation (i.e., traveling) and comprising a light source that projects light onto the wheel and a light detector that detects the light reflected by the wheel. The wheel integrity monitoring system is configured to analyze the reflected light to determine if the wheel is defective.

Note that the invention can also be used for assessing the structural integrity of wheels of in other types of vehicles and it is not limited for use only with railway cars.

These and other aspects of the present disclosure will now become apparent to those of ordinary skill in the art upon review of the following description of embodiments in conjunction with the accompanying drawings.

BRIEF DESCRIPTION OF DRAWINGS

A detailed description of embodiments of the present disclosure is provided below, by way of example only, with reference to drawings annexed hereto, in which:

FIG. 14 also shows the coordinate system used for performing image-processing operations to characterize the wheel flaw;

Figure 1:
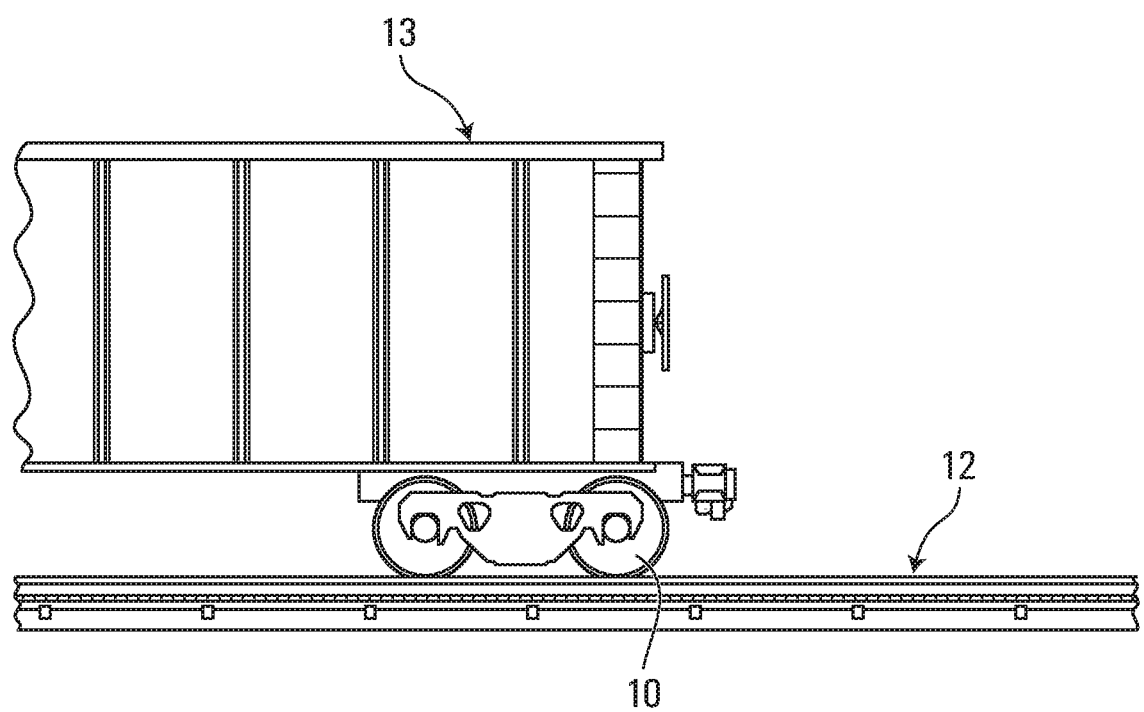
FIG. 1 is a fragmentary side elevational view of a railcar supported by a plurality of wheels on a track.
Figure 2:
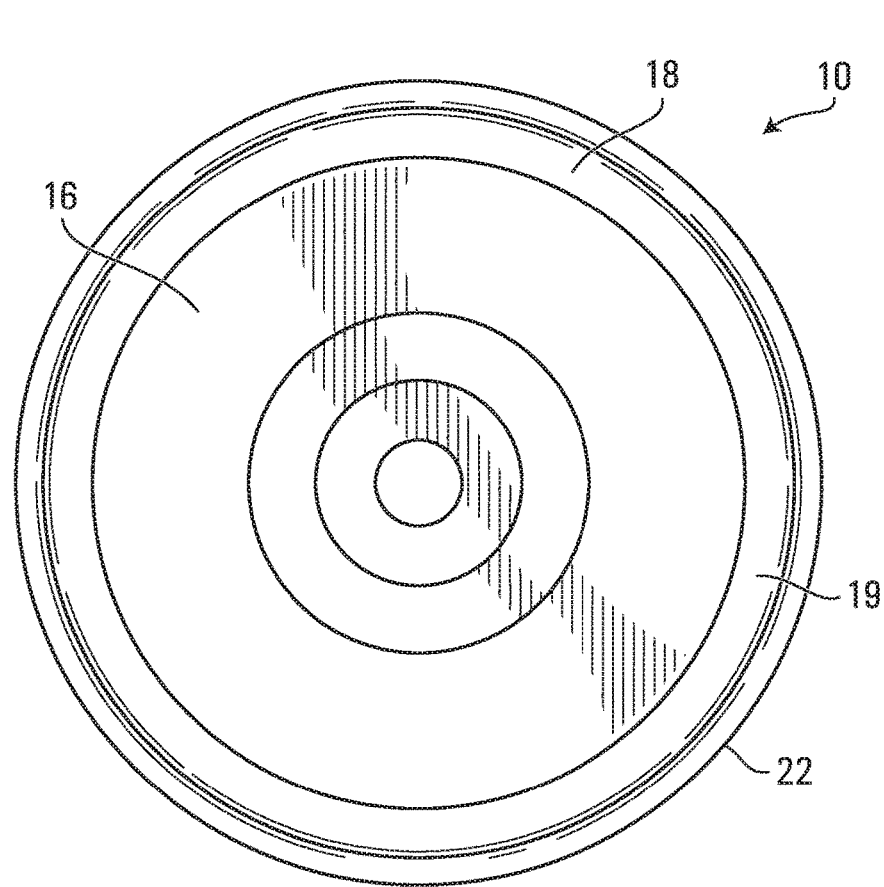
FIG. 2 is an enlarged plan view of one of the wheels shown in FIG. 1.
Figure 3:
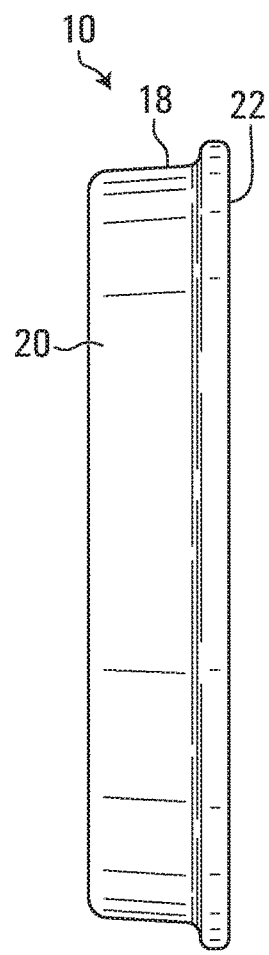
FIG. 3 is a side elevational view of the wheel shown in FIG. 2.

In the drawings, embodiments of the present disclosure are illustrated by way of example. It is to be expressly understood that the description and drawings are only for purposes of illustration and as an aid to understanding, and are not intended to be a definition of the limits of the invention defined herein.

DETAILED DESCRIPTION OF EMBODIMENTS

FIGS. 1 to 4 show an example of a railcar wheel 10 designed to be used on a track 12

In this embodiment, the wheel 10 supports a railcar 13 as it travels on the track 12. As shown in FIG. 1, the wheel 10 is one of a plurality of wheels that support the railcar 13. In the specific example shown in FIG. 1, each end portion of the railcar 13 is supported by a bogie that uses a combination of four wheels 10 integrated into a unitary structure. In this embodiment, the wheel 10 comprises a plate portion 16 and a rim portion 18 disposed radially outwardly of the plate portion 16. The rim portion 18 of the wheel 10 defines a peripheral surface 20 for engaging the upper surface of a rail 14 of the track 12. The wheel 10 further comprises a flange portion 22 for maintaining the wheel 10 captive on the rail 14.

Figure 5:
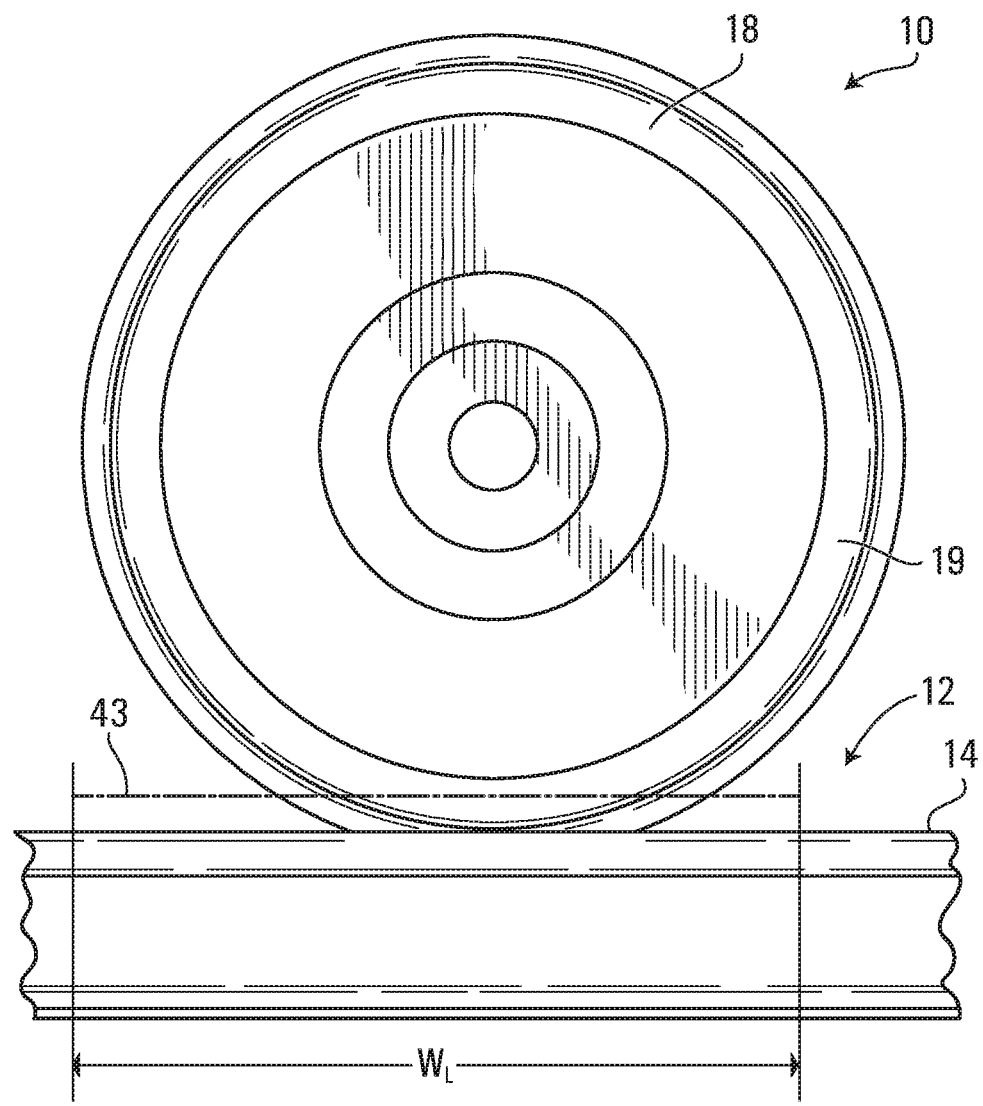
FIG. 5 illustrates the geometric relationship between a linear light beam projected above the top surface of the rail and painting a rim portion of the wheel rolling on the rail, showing how the light beam progressively scans the wheel rim as the wheel revolves.

FIG. 5 illustrates the principle of operation of an embodiment of a wheel integrity monitoring system 30 that is configured to monitor the structural integrity of the wheel 10, in order to determine if the wheel 10 has a flaw. In this embodiment, the wheel integrity monitoring system 30, shown at FIG. 6, comprises a wayside light source 32 for projecting light that paints the wheel 10, a wayside light detector 34 for detecting a reflection of the light projected by the light source 32 onto the wheel 10, a wheel presence sensor 36 for sensing a presence of the wheel 10, and a control unit 38 that is connected to the wayside light source 32, the wayside light detector 34 and the wheel presence sensor 36 for controlling their operation and performing analysis of their respective outputs.

As will be discussed in more detail below the wheel integrity monitoring system 30 can monitor the integrity of the wheels of a railcar in an automated manner while the railcar is in operation (i.e., traveling). In a specific example implementation, this is achieved by analyzing a light that is projected by the wayside light source 32 onto the wheel 10 and detecting anomalies in the reflection of the projected light to determine if a flaw is present on the wheel.

Figure 6:
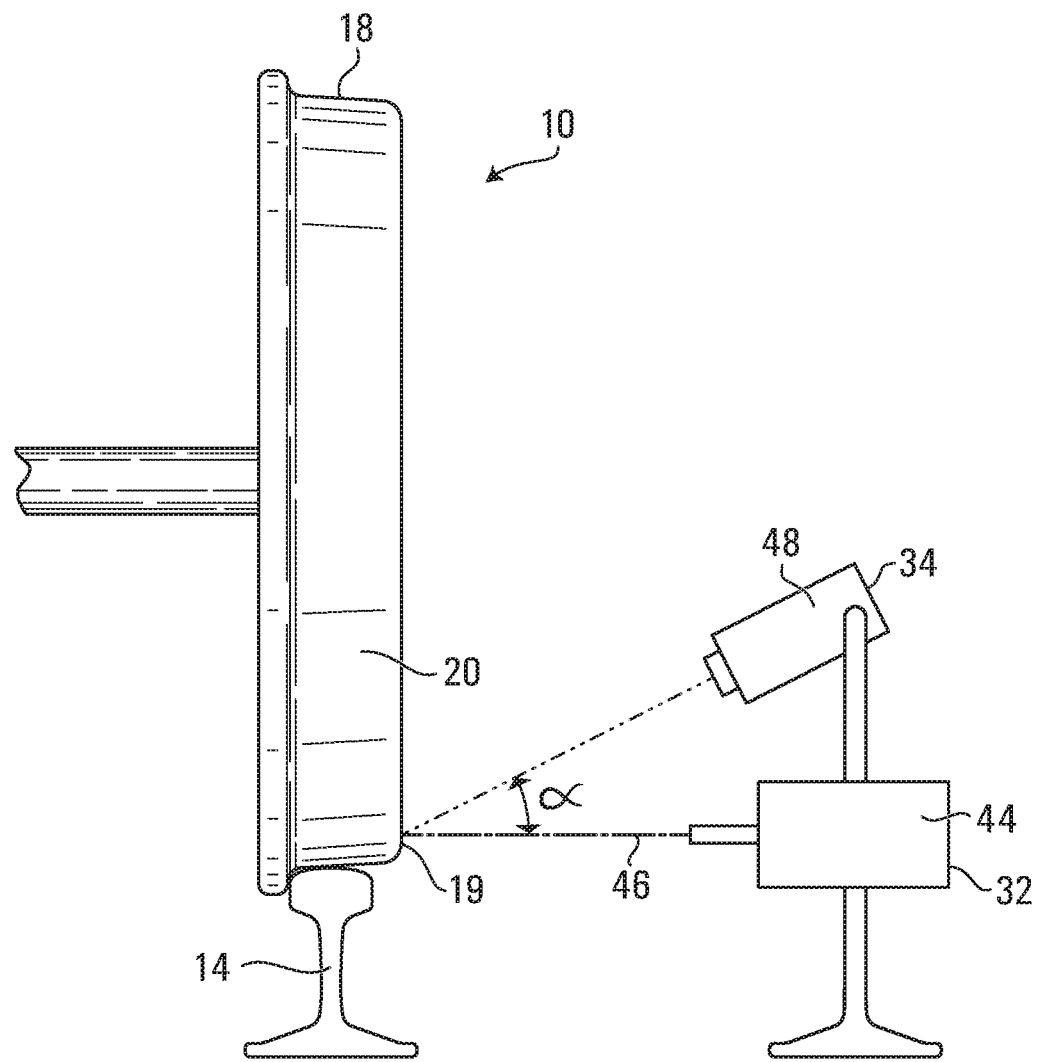
FIG. 6 is a side elevational view showing a wayside light source and a wayside light detector of the wheel integrity monitoring system.

As shown in FIG. 6, the wayside light source 32 is located adjacent the track 12 such that the wheel 10 passes by the light source 32 as the railcar 13 travels on the track 12. The wayside light source 32 is configured to project light onto at least a portion of the wheel 10 that is to be inspected. For instance, the wayside light source 32 projects a light beam 46 onto a front surface 19 of the rim portion 18 of the wheel 10. The light beam 46 is shaped as a narrow elongated beam projected onto the wheel 10 along a generally horizontal plane. The light beam 46 is produced by a collimated light source, such as a laser beam, that oscillates to create a continuous and straight horizontal line projection 43 (i.e., a linear projection) painting the front surface 19 of the rim portion 18 the wheel 10. As shown in FIG. 5, the straight line projection 43 formed by the light beam 46 defines an inspection area which has a width WL designed to scan the entirety of the circumference of the rim portion 18 of the wheel 10, as the wheel 10 revolves. Thus, the width WL of the inspection area is equal to or greater to the circumference of the rim portion 18 of the wheel 10.

In a specific example of implementation, the wayside light source 32 comprises a laser beam projector 44. As indicated earlier, in order to achieve the linear projection 43, the laser beam 46 oscillates in a horizontal plane. The oscillation is rapid such that in practice the beam 46 creates a continuous trace of light at a short distance above the top surface of the rail 14. The wayside light source 32 may comprise any other suitable type of light source in other embodiments.

Note that it may not be practical to use a single light source in order to achieve the desired inspection area width WL, as the range of oscillation becomes too great for a single light source. In such a case, it is possible to use multiple light sources that are aligned and oscillate in synchronism in order to create the straight horizontal line projection 43.

In the example of the implementation shown at FIGS. 5 and 6, the laser beam 46 defines an angle of incidence of 90° with the plane of the wheel 10. This is a preferred form of implementation. However the angle of incidence may be different without materially changing the way the system works. For example, in some cases, the angle of incidence of the laser beam 46 with the plane of the wheel 10 may be less than 90°, such as somewhere in the range of 70° to 90°. In other words, the laser beam 46 would not be perpendicular to the plane of the wheel 10. This may be useful to minimize the possibility of projecting the laser beam 46 across the track 12 (when no wheel is blocking it) and potentially into a person's eyes, which could be harmful. In order to avoid this potential problem, where the laser beam 46 is perpendicular to the plane of the wheel 10, the wheel integrity monitoring system 30 may comprise a wall at a side of the track 12 opposite to the side where the wayside light source 32 is disposed to block the laser beam 46 from projecting beyond the wall.

The wayside light detector 34 is configured to sense a reflection of the linear projection 43 of the light beam 46 painting the rim portion 18 of the wheel 10. In this embodiment, the light detector 34 is disposed vertically above the wayside light source 32 adjacent to the track 12. In a specific example of implementation, as shown in FIG. 6, the wayside light detector 34 comprises a camera 48 that records successive frames of an inspection field 50 encompassing the projection 43 of the light beam 46. In other words, the inspection field 50 has a width WL. The camera 48 is a high-speed camera that is capable of recording fast-moving objects by capturing at least 140 frames per second. This would allow the camera 48 to generate 10 successive frames per revolution of the wheel 10, at high speeds (e.g., 70 mph). In some embodiments, the camera 48 may not need to be a high-speed camera as the wheel monitoring system 30 may be placed near a location where the railcar 13 is expected to travel relatively slowly (e.g., entrance of a train yard).

The frame rate of the camera 48 may be less than 140 frames per second in other embodiments. Notably, the necessary frame rate of the camera 48 depends on the size of the wheels of the railcar 13. Thus, when the wheels are bigger (i.e., have a bigger diameter), the frame rate of the camera 48 may be reduced.

The camera 48 also defines a viewing angle α that is measured relative to the axis of the light beam 46 projected by the wayside light source 32. In this particular example, the axis of the light beam 46 remains in a horizontal plane, hence the viewing angle α is measured relative to the horizontal plane. Note that in other applications, the axis of the light beam 46 may not be horizontal. The viewing angle α of the camera 48 is more than 0° and it is preferably in the range from about 30° to about 70°. More preferably, this range is from about 40° to about 60°. Even more preferably, the viewing angle of the camera 48 is at about 45°.

The purpose of the wheel presence sensor 36 is to detect an incoming wheel 10 such that the wheel integrity monitoring system 30 can be activated in time in order to perform a wheel scanning cycle. In a specific example of implementation, the wheel presence sensor 36 maybe a magnetic sensor that changes state in the vicinity of a metallic object. The wheel presence sensor 36 can be mounted on the track 12. For instance, the wheel presence sensor 36 can be mounted below an interface between the wheel 10 and the rail 14. Thus, when the wheel 10 is positioned on top of the rail 14, the wheel presence sensor 36 detects the incoming wheel 10 and sends a signal to the control unit 38 which, in response to this signal, actuates the wayside light source 32.

The wheel presence sensor 36 may be configured in other ways. For instance, the wheel presence sensor 36 may comprise a sensor that physically contacts the wheel 10. An example of such a sensor is a pressure switch mounted to the rail 14 and configured to interact with the flange portion 22 of the wheel 10. In yet another example, the wheel presence sensor 36 may comprise an optical sensor that senses when a light beam (such as a laser beam) is blocked by the wheel 10.

In other embodiments, the wheel presence sensor 36 may be dispensed with. For instance, the wayside light source 32 may remain in an actuated state (i.e., projecting the light beam 46) continuously. A variant of this approach is to use the laser beam 46 itself for sensing the presence of the wheel 10. In such embodiments, the laser beam 46 is parked to an extreme end of the range of oscillations in the horizontal plane. The camera 48 scans its field of view and as soon as it senses some reflection of the laser beam 46, which indicates an incoming wheel 10, the laser beam 46 starts its oscillating motion to create the projection 43.

Figure 4:
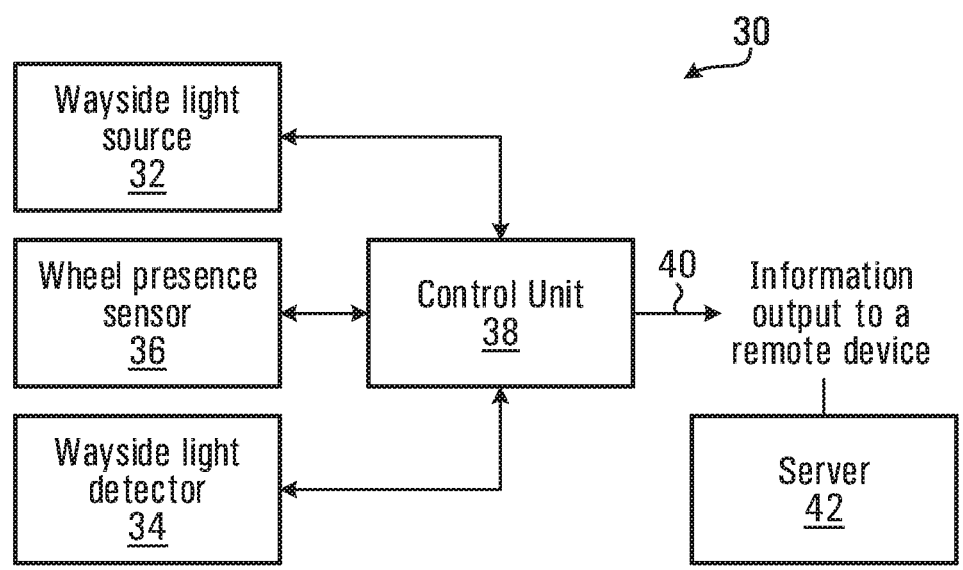
FIG. 4 is a block diagram illustrating the main components of a wheel integrity monitoring system in accordance with an embodiment of the present invention.
Figure 7:
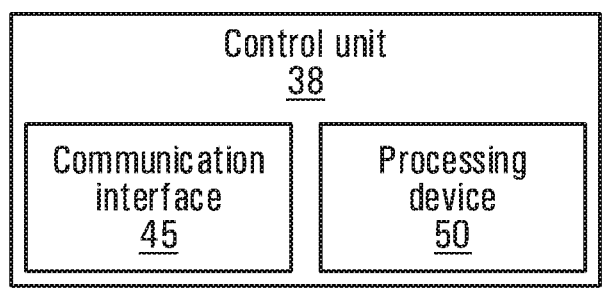
FIG. 7 is a more detailed block diagram of the control unit of the wheel integrity monitoring system illustrated in FIG. 4.
Figure 8:
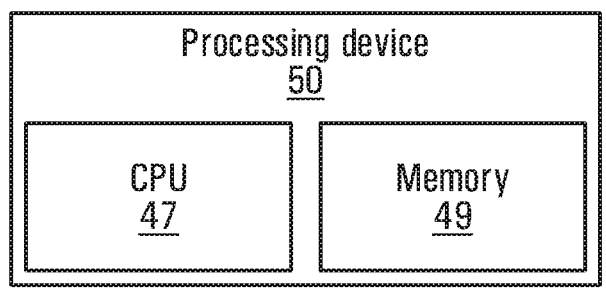
FIG. 8 is a more detailed block diagram of the processing device shown in FIG. 7.

As best shown in FIGS. 4, 7 and 8, the control unit 38 is configured to control and/or receive input signals from the wayside light source 32, the wayside light detector 34 and the wheel presence sensor 36. The control unit 38 comprises a communication interface 45 and a processing device 50. The purpose of the communication interface 45 is to allow the control unit 38 to communicate with a remote entity 42 such as a server where data can be stored. The processing device 50 constitutes the signal processing entity, which performs the flaw detection function and also overall control of the system 30.

The communication interface 45 includes an output 40 through which it can transmit or receive information to/from a remote entity 42. The communication link between the output 40 and the server 42 may be implemented as a physical wired connection or as a wireless connection (e.g., a wireless network connection).

The processing device 50 includes two main components, namely a CPU 47 and a memory 49. The CPU 47 executes software stored in the memory 49. The software stored in the memory 49 defines the functionality of the wheel integrity monitoring system 30, which is illustrated by the flowchart at FIG. 9.

At step 1010 of the process, the presence of the wheel 10 is detected by the wheel presence sensor 36. Upon sensing the wheel 10, the wheel presence sensor 36 sends a signal to the control unit 38.

At step 1020, in response to reception of the signal from the wheel presence sensor 36, the control unit 38 increments a wheel counter. For instance, the processing device 50 includes a wheel counting module (e.g., implemented in software) that keeps a count of the number of wheels detected by the wheel presence sensor 36 in a given train. As such, when the control unit 38 receives the signal from the wheel presence sensor 36, the control unit 38 increments by one the wheel count that is kept by the wheel counting module.

As will be explained in greater detail below, the wheel counting module allows the control unit 38 to associate a flaw detected in a wheel with a specific wheel number in the overall count. For example, if the wheel counting module has counted four consecutive wheels and a flaw is detected after the fourth wheel has been counted, then the control unit 38 can infer that the fourth wheel has a flaw. Furthermore, in some embodiments, the timing between increments of the wheel count may allow the control unit 38 to identify the bogie with the faulty wheel. If the timing between successive increments to the wheel counter falls within a certain range (e.g., under one second), the control unit 38 may determine that the successive wheels that have been detected by the wheel presence sensor 36 are part of a same bogie of the railcar.

At step 1030, also in response to the reception of the signal from the wheel presence sensor 36, the control unit 38 actuates the wayside light source 32 to cause it to project the light beam 46 onto the wheel 10. It is noted that this step would be omitted in embodiments where the light source 32 continuously projects the light beam 46.

At step 1040, the wayside light detector 34 captures image information of the wheel 10 as the light beam 46 is projected onto the wheel 10. The image information captured by the wayside light detector 34 comprises successive frames of the detection field 50 which together show the passage of the wheel 10 along the width WL of the light beam 46. The wayside light detector 34 sends a signal to the control unit 38 containing the image information that it has captured. The wayside light detector 34 may send the image information to the control unit 38 frame by frame or the entire frame set may be sent as a single block of data.

At step 1050, the control unit 38 processes the image information received from the wayside light detector 34. The processing apparatus 50 processes the image information to derive at least one parameter regarding the integrity of the wheel 10 from the image information.

At conditional step 1060, the control unit 38 determines whether a flaw in the wheel 10 has been identified in the image information received from the wayside light detector 34. If no flaw has been identified, the process restarts at step 1010. However, if a flaw is identified, the process proceeds at step 1070 where the control unit 38 sends information to the remote entity 42 regarding one or more flaws detected on the wheel 10. The information sent to and recorded at the remote entity 42 may include one or more of a date and time of the detection of the flaw, a wheel number associated with the wheel 10, a bogie number associated with the wheel 10, a railcar number associated with the wheel 10, flaw characterization information and the raw image information that was captured by the wayside light detector 34 on the basis of which the flaw was detected. The process then restarts at step 1010 where the presence of the next wheel is detected.

Alternatively, the control unit 38 may be configured to send information to the remote entity 42 even when no flaw has been identified in the wheel 10. That is, when no flaw is detected in the wheel 10, the control unit 38 may send information to the remote entity 42 conveying that the wheel 10 is structurally sound.

Variations of this process are possible, as discussed below

Figure 12:
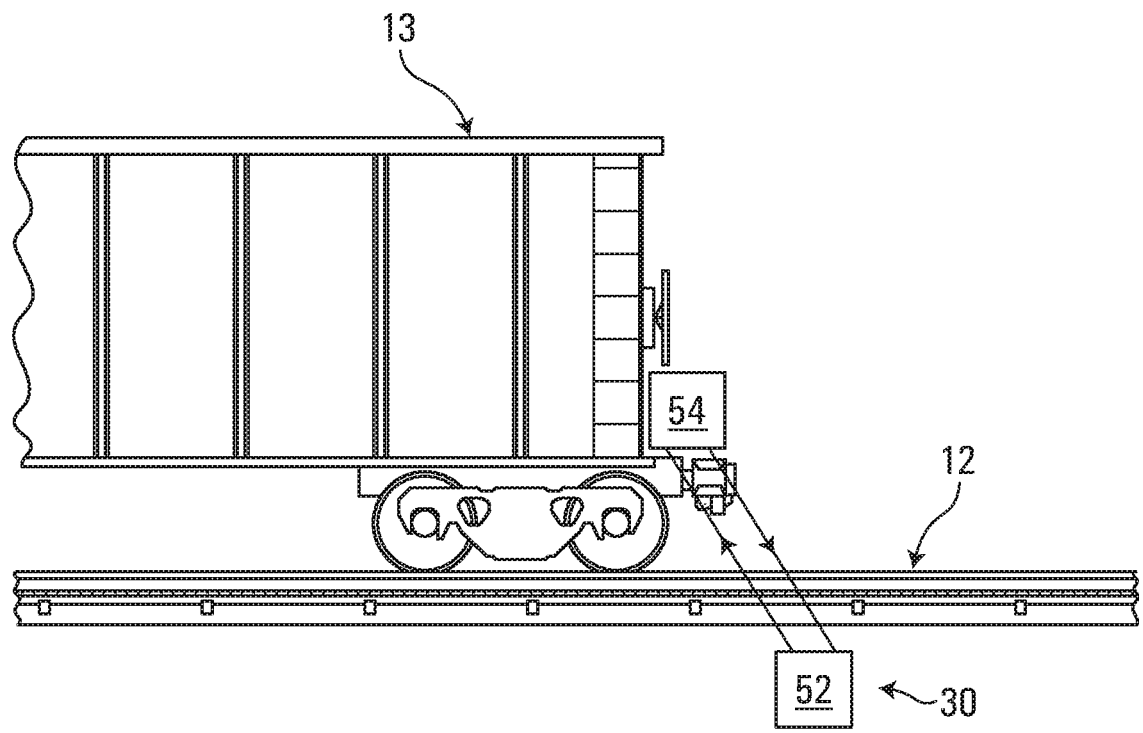
FIG. 12 shows an example of an embodiment in which the wheel integrity monitoring system comprises a reader that communicates with a transponder on the railcar in order to identify the railcar as it passes by the reader.

For instance, as shown in FIG. 12, the wheel integrity monitoring system 30 is configured to identify the particular railcar 13 that includes the wheel 10. In one example of implementation, the wheel integrity monitoring system 30 comprises a reader 52 configured to communicate with a transponder 54 mounted on the railcar 13. Thus, when the railcar 13 is in the vicinity of the wheel integrity monitoring system 30, the reader 52 emits an interrogation signal, which is received by the transponder 54 of the railcar 13. In response to the interrogation signal, the transponder 54 generates a response containing identification information such as the serial number of the railcar. The reader 52, which communicates with the control unit 38, then sends the data identifying the railcar 13 to the control unit 38, which in turn conveys this to the remote entity 42 (e.g., identifying a wheel which has a flaw or that is free of flaws).

In some embodiments, the reader 52 may replace the wheel presence sensor 36 in the wheel integrity monitoring system 30. In this form of implementation, however, the reader 52 needs to be located relative to the wheel integrity monitoring system 30 such that the presence of the railcar 13 is sensed before any of the wheels thereof reaches the light detector 34. Also, the wheel counter module would be modified such as to reset itself to 0 at each time a new railcar is detected.

Figure 13:
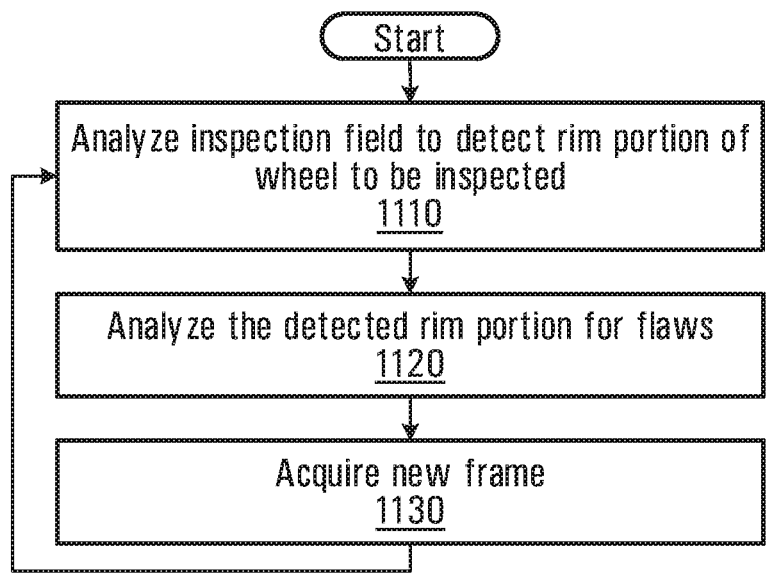
FIG. 13 is a flow chart of a process implemented by the control unit of the wheel integrity monitoring system.

The control unit 38 can process the image information conveyed by the wayside light detector 34 in various ways. An example of a process implemented by the control unit 38 to process the image information will now be described with reference to FIG. 13.

At step 1110, the control unit 38 analyzes a first frame of the image information that is transmitted by the wayside light detector 34. More particularly, the processing apparatus 50 of the control unit 38 analyzes the inspection field 50 to detect the rim portion 18 of the wheel 10 that is to be inspected. The process starts by identifying the general location of the straight-line projection 43 in the image. This can be performed by identifying in the frame the pixels that convey colour information corresponding to the colour of the reflected light. When the light beam 46 is of a particular colour, which preferably is contrasting from the background image, a colour filter can isolate the pixels in the frame that correspond to the projection 43. For instance, if the light source is a bright red, which would be quite contrasting with the colour of the wheel 10, that would likely be a rusty colour, the filter can eliminate all the pixels from the image in which the bright red colour is absent, thus leaving only the image of the projection 43. That process can be repeated for the analysis of each image frame.

Note that the light source 32 does not need to produce visible light. It is possible to use a light source 32 which projects light that is not visible to the naked eye, such as infrared light or ultraviolet light. The advantage of this variant is to make the wheel integrity monitoring system 30 less conspicuous. In this form of implementation, the light detector 34 would need to be modified such as to be responsive to the non-visible light.

Once the position of the projection 43 in the image has been identified, the next step is to identify the segment of the projection 43 that is reflected off the rim portion 18 of the wheel. That analysis is performed based on the intensity of the reflected light; some areas of the wheel 10 will reflect light stronger than others, which makes it possible to determine where the rim portion 18 resides and distinguish it from reflections generated by other areas of the wheel, such as the flange portion 22.

Figure 18:
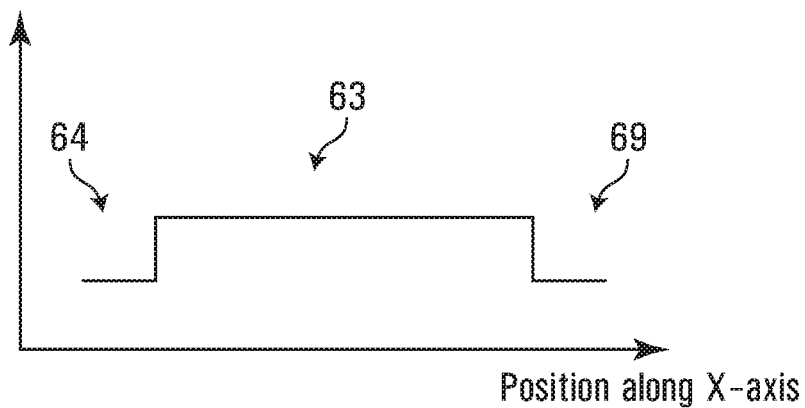
FIG. 18 shows an example of a pattern of intensity of reflected light, as detected by the control unit of the wheel integrity monitoring system.

FIG. 18 shows the pattern of reflected light intensity that would be observed in the image of the wheel 10. The pattern includes a central high intensity reflection area 63 that corresponds to the rim portion 18 of the wheel 10. Since the rim portion 18 of the wheel 10 is closest to the light source, it reflects light the strongest. On each side of this central high intensity reflection area, two zones 64, 69 of lesser intensity exist that correspond to reflections from the flange portion 22. Accordingly, the wheel 10 presents a unique intensity of reflection signature that allows identifying in the image the segment of the projection 43 spanning the width of the rim portion 18.

The software can rely on additional parameters, which in conjunction with the reflection signature can assist in identifying the segment of the projection 43 spanning the width of the rim portion 18 more precisely. Since railway wheels come in known diameters, the segment of the projection 43 spanning the width of the rim portion 18 will have a known length for a given wheel diameter. The software performing the analysis of the pattern of reflected light can store in a table the length information associated with the respective wheel sizes that the wheel integrity monitoring system 30 will be scanning in practice. In this example, the software uses the length information to more precisely distinguish in the intensity of reflection signature the segment associated with the rim portion 18 from the segments corresponding to the flange portion 22.

In the next step of the process, which is step 1120, the segment of the projection 43 isolated earlier, is processed to determine if a flaw is present. To that end, the control unit 38 analyzes the geometry of the projection 43 on the rim portion 18 of the wheel 10. If the projection 43 on the rim portion 18 is a straight line, which means that the rim portion 18 is flat, then that segment of the wheel 10 is considered to be structurally sound. In contrast, if there is a deviation from a straight line, the control unit 38 determines that a flaw is present.

Figure 10:
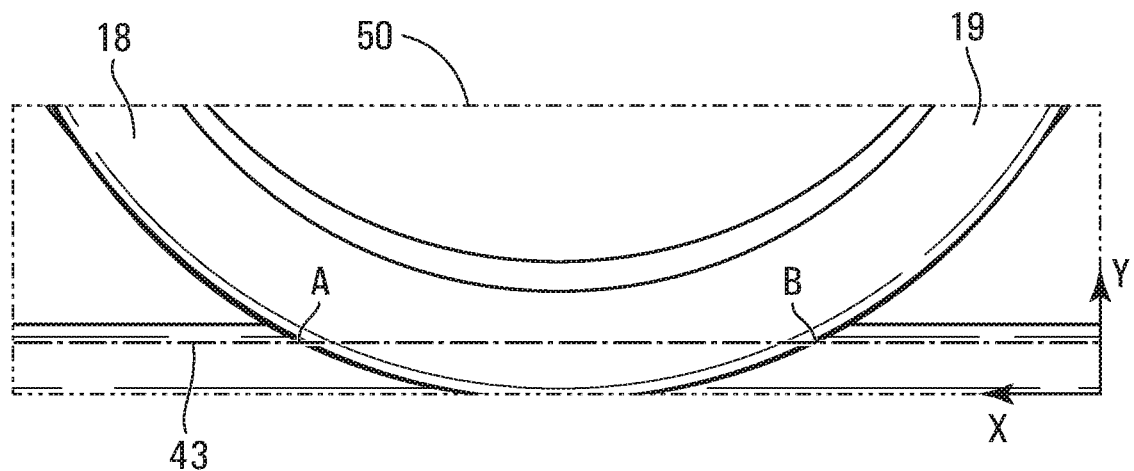
FIG. 10 is an image frame captured by the wayside light detector, illustrating the shape of the light beam painting the rim portion of the wheel when no flaw is present on the rim portion of the wheel.
Figure 11:
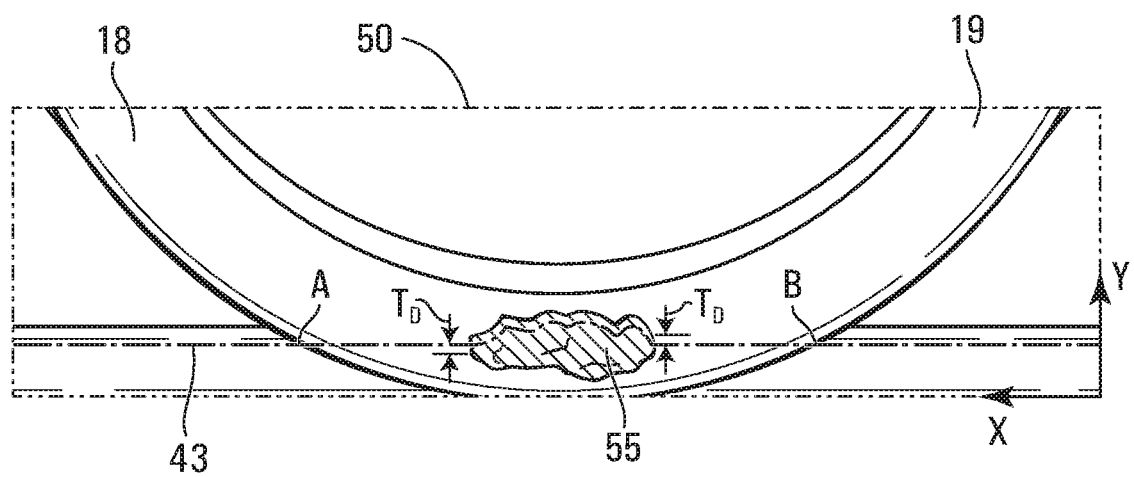
FIG. 11 is an image frame captured by the wayside light detector illustrating the anomaly acquired by the shape of the light beam painting the rim portion of the wheel, when a flaw is present on the rim portion of the wheel.

FIG. 10 shows an example of a frame of the image information captured by the wayside light detector 34 when the rim portion 18 of the wheel 10 is free of flaws. In such a case, the projection 43 of the light beam 46 on the rim portion 18 between points A and B remains generally straight and horizontal such that a deviation of the projection 43 of the light beam 46 along a Y axis of the inspection field 50 is negligible. On the other hand, FIG. 11 shows an example of a frame of the image information captured by the wayside light detector 34 when the rim portion 18 of the wheel 10 has a flaw 55. In such a case, the projection 43 of the light beam 46 on the rim portion 18 between points A and B contains an anomaly; it deviates along the Y axis of the inspection field 50 in a non-negligible manner.

To determine whether the projection 43 on the rim portion 18 is straight, the software looks at the Y coordinates of the pixels associated with the projection 43. If the Y coordinates are identical for all pixels, then the line is straight. On the other hand, if the Y coordinates show variations, which means that the line is not straight, then a flaw is likely present. The magnitude of the variations determines the extent of the flaw.

The control unit 38 compares the deviation of the projection 43 of the light beam 46 on the rim portion 18 along the Y axis of the inspection field 50 with a threshold deviation TD. The threshold deviation TD is a maximal deviation of the projection 43 of the light beam 46 along the Y axis of the inspection field 50 that is allowed for the wheel 10 to be considered as being free of flaws. For instance, the control unit 38 may store a value of the threshold deviation TD in the memory portion 49 of the processing apparatus 50. The threshold deviation TD may have any suitable value. For example, in some cases, the threshold deviation TD may be no more than 5 mm, in some cases no more than 3 mm, in some cases no more than 2 mm, and in some cases even less. The threshold deviation TD may have any other suitable value in other embodiments.

When the control unit 38 determines, at step 1060 that the image frame conveys a flaw, the process proceeds with recording the flaw at step 1070.

Figure 9:
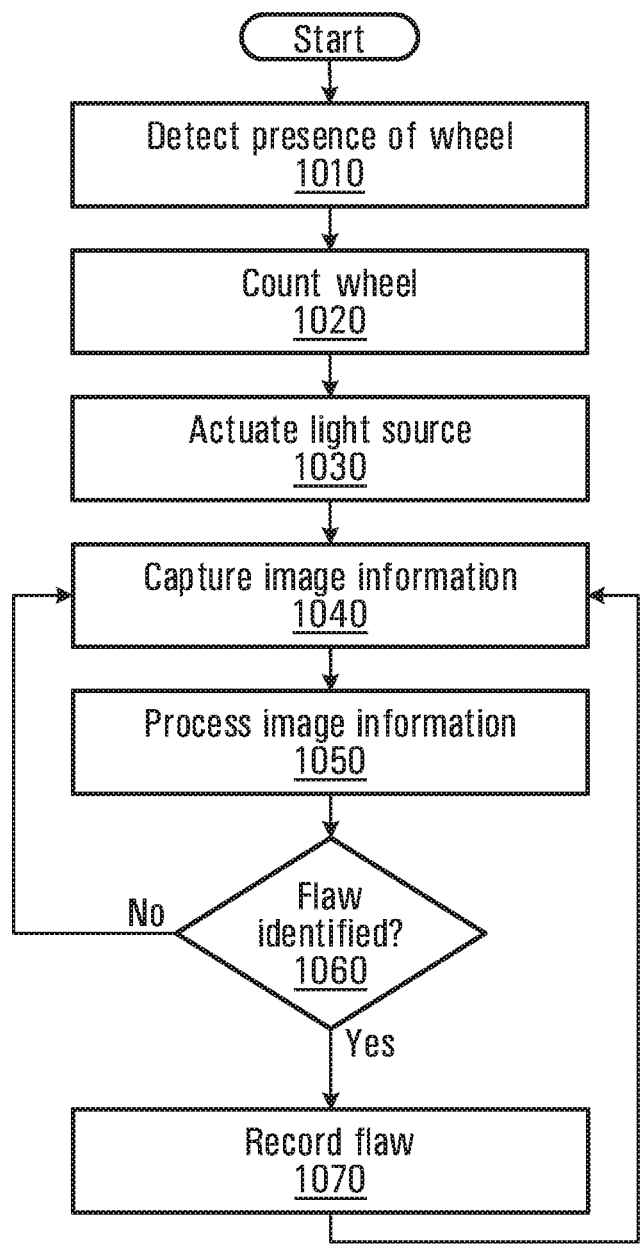
FIG. 9 is a flow chart of a process implemented by the wheel integrity monitoring system of FIG. 4.

Once a flaw is identified in the image frame, the scanning process may stop in the sense that the identification of the flaw will generate an alert that will result in a call for inspection by a human operator. Accordingly, under this option, the additional image frames that are generated for that particular wheel will not be analyzed. Alternatively, the additional image frames are analyzed in order to better characterize the flaw and provide additional information to the human operator that will facilitate the follow-up work to be done on the wheel 10. FIG. 9 illustrates that particular option showing that once the flaw identified in the image frame is recorded at step 1070, the processing continues at step 1040 where a new image frame is processed. The process is then repeated until the entire periphery of the rim portion 18 has been scanned.

Figure 14:
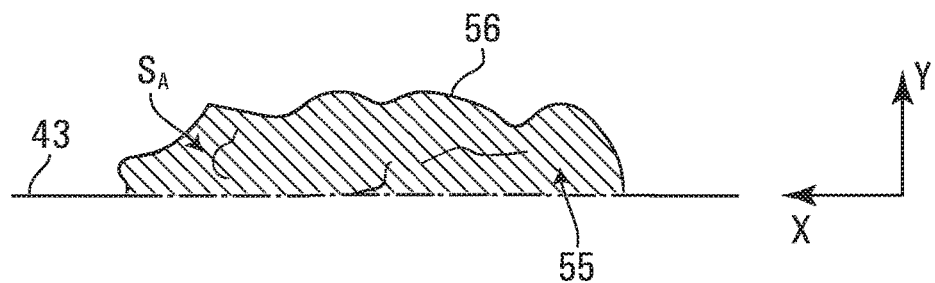
FIG. 14 is a detailed view of an image captured by the wayside light detector, showing the anomaly imparted to the light beam shape when the light beam scans a portion of the wheel, which is broken.

In some embodiments, in addition to providing a binary determination flaw/no flaw, the control unit 38 evaluates specific parameters of the flaw 55 in order to characterize it. For instance, with reference to FIG. 14, the control unit 38 determines a severity of the flaw 55 based on a distribution of the pixels representing the anomaly of the projection 43 of the light beam 46 in the inspection field 50, both along the Y axis and the X axis. For instance, the control unit 38 determines a "nominal" position of the projection 43 along the Y axis, corresponding to a projection 43 associated with a wheel 10 which is free of flaws. This nominal position of the projection 43 may be pre-set in the control unit 38 (e.g., in the memory 49 of the processing device 50) through a calibration process of the wheel monitoring system 30. The control unit 38 may then identify an anomaly 56 conveyed by the projection 43 by analyzing the coordinates of the pixels associated with the anomaly 56 of the projection 43.

By determining the difference in the coordinates of the anomaly 56 relative to the coordinates of the nominal position of the projection 43, the control unit 38 may determine the severity of the flaw 55.

Several examples can be considered. For example, the extent of the anomaly 56 in the Y direction is indicative of how deep the flaw is. Similarly, the extent of the anomaly 56 in the X direction indicates how extensive the flaw is. The X and Y extents can be used alone or in combination to characterize the flaw.

When considering the X and Y extents together, it is possible to compute the volume of material that has broken away. Mathematically, that computation involves determining the surface area SA shown at FIG. 14. Note that such computation would be an approximation of the volume of material missing since the Z dimension is not being considered, however, it would still provide a good indication of how severe the flaw is. Also note that the lack of Z dimension can be alleviated by considering multiple image frames in conjunction with one another. As the wheel 10 rotates and is being scanned, each frame conveys a different aspect of the anomaly 56, where the anomaly is essentially rotated along the axis of the wheel 10 by an angular extent corresponding to the wheel rotation during the time period between two successive image frames. That process, allows gathering limited three-dimensional information of the anomaly 56, allowing computing more precisely the volume of material missing. The three-dimensional information is limited because the scanning doesn't occur over 360°; it occurs over the arc of a circle over which the anomaly 56 travels while being scanned by the projection 43. Still, it provides valuable information in terms of a directional distribution of the anomaly 56, thus allowing to better characterize the flaw 55.

The relationship between the X and Y extents also conveys relevant information. When Y is significantly larger than X, the flaw 55 is fissure like; that would be a flaw which is deep and narrow. Such a situation could be of concern because a fissure can propagate and cause a catastrophic failure of the wheel 10.

Conversely, when dimension X is larger than dimension Y, the flaw 55 is rather superficial, hence less risky for continued operation of the wheel 10.

The memory 49 can store a table mapping flaw characterizations on the basis of the dimensions X and Y. That is, the software, based on the computed dimensions X and Y of the anomaly 56 tries to match those values to any one of the categories in the table. The best match yields a characterization that can more clearly convey to a human operator the nature of the flaw 55 that is being observed on the wheel 10. In a simple example, the characterizations can be a list of categories, say from 1 to 5. Category 1 corresponds to a flaw, which is the most significant and that may require to withdraw the wheel 10 from operation immediately. In contrast, category 5 corresponds to a flaw that is the least significant and does not require immediate intervention. Category 1 may be associated with flaws where a significant volume of material has been removed or where a fissure is likely present. Category 5, on the other hand would be associated with flaws where a lesser volume of material is removed and the pattern of the anomaly is such that no fissure exists.

In a possible variant, the viewing angle $\alpha$ of the light detector 34 can be selected such as to avoid the necessity from processing the projection 43 for the purpose of distinguishing between reflections generated by the rim portion 18 of the wheel 10 and reflections from the flange portion 22 of the wheel 10. By making the viewing angle $\alpha$ sufficiently large, the flange portion 22 is obscured from view by the wheel structure, as shown in FIGS. 10 and 11. An image frame, taken from a viewing angle corresponding to the perspective with which a wheel is shown in those figures would only contain the segment of the projection between points A and B. Accordingly, from the perspective of simplifying the image processing, that approach could be preferred.

A smaller viewing angle, while presenting challenges in terms of distinguishing between the reflections generated by the rim portion 18 of the wheel 10 from the reflections generated by the flange portion 22, may have advantages in that it can allow scanning the flange portion 22 to assess its structural integrity. The image processing operation would be generally similar to the one described in connection with assessing the structural integrity of the rim portion 18. The only difference is that an anomaly in the case of a broken flange 22 would simply show up as a gap in the projection 43. Such analysis could supplement the scanning of the rim portion 18 of the wheel 10 since it would also be able to detect structural defects on the flange portion 22.

Once the characterization of the flaw 55 is performed, the control unit 38 reports a detection event to the remote entity 42. The information, which is sent to the remote entity 42 would include identification information of the wheel 10, whether or not a flaw has been identified and the characterization of the flaw, if any such as the type of the flaw, its location on the wheel 10 (rim portion 18 or flange portion 22), etc. In a possible variant, the characterization of the flaw is performed by the remote entity 42. In this form of implementation, the control unit 38 will send relevant X and Y dimensions of the anomaly 56 to the remote entity 42 that will perform the necessary processing to identify the category in which the flaw is classified. In another possible variant, the control unit 38 can simply send the entire image information to the remote device 42 that will perform the entirety of the processing.

Figure 15:
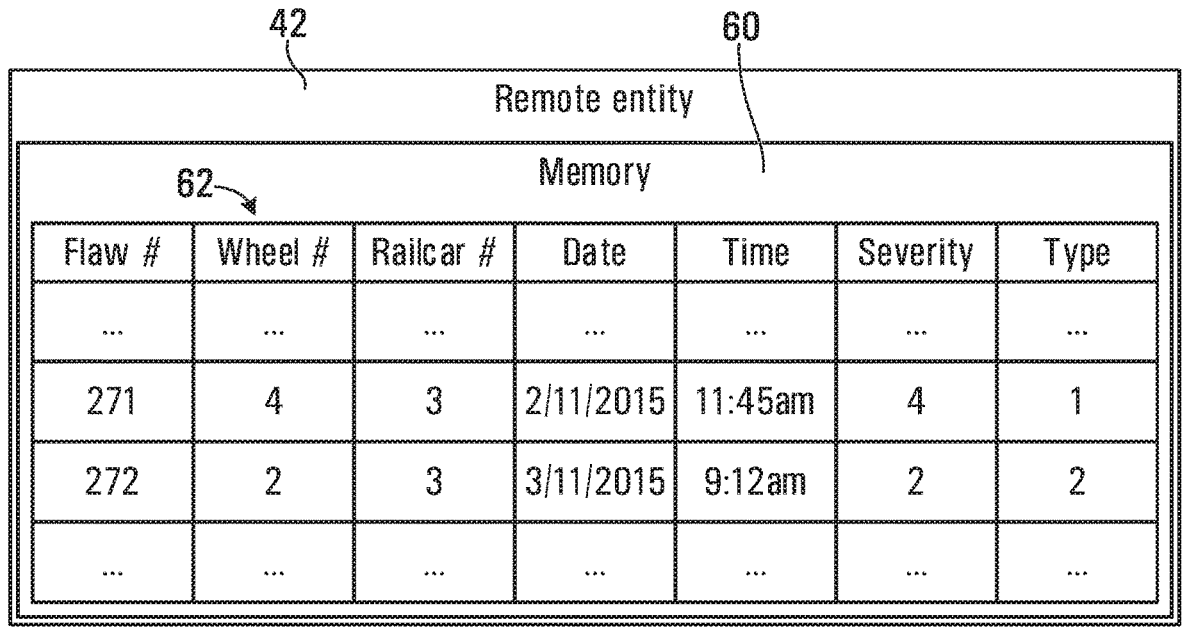
FIG. 15 shows a data structure stored remotely from the wheel integrity monitoring system for recording wheel scanning events performed by the wheel integrity monitoring system.

Thus, the remote entity 42 may store various types of information pertaining to a flaw associated with the wheel 10. More particularly, as shown in FIG. 15, the remote entity 42 comprises a memory 60 in which information regarding flaw detection events (i.e., detected flaws) are stored. In this embodiment, the memory 60 stores a table 62 containing different types of information regarding detection events. For example, this may include the identification of the wheel 10 in which the flaw 55 was detected, an identification of the railcar associated with the wheel 10, a date and time the flaw 55 was detected, the category of the flaw 55, the volume of material of the wheel 10 that has chipped away and the location of the flaw on the wheel. The remote entity 42 may thus provide a detailed record of detection events for further reference.

In a possible variant, the memory 60 stores information generated by a number of the different monitoring systems throughout the railway network. In this fashion, the railway wheel can be scanned by different inspection systems, as the wheel 10 travels from one location to the other of the railway network, and the different results collected to determine whether they are consistent and also any whether changes occur to a detected flaw 55. For instance, if in the case of a given wheel the characterization of the flaw 55 progressively increases towards a higher category, the remote entity 42 then determines that the flaw 55 is degrading quickly and may sound an alarm such that corrective action can be taken.

Moreover, in some embodiments, the information sent by the control unit 38 to the remote entity 42 may include at least part of the image information in which the flaw 55 was detected. The remote entity 42 may thus store the image information and associate it with the corresponding detection event. As the image information can be relatively large in size, in some embodiments, the remote entity 42 may keep the image information stored for a limited amount of time (e.g., 1 week, 1 month) after which the image information may be deleted from the remote entity 42.

Figure 16:
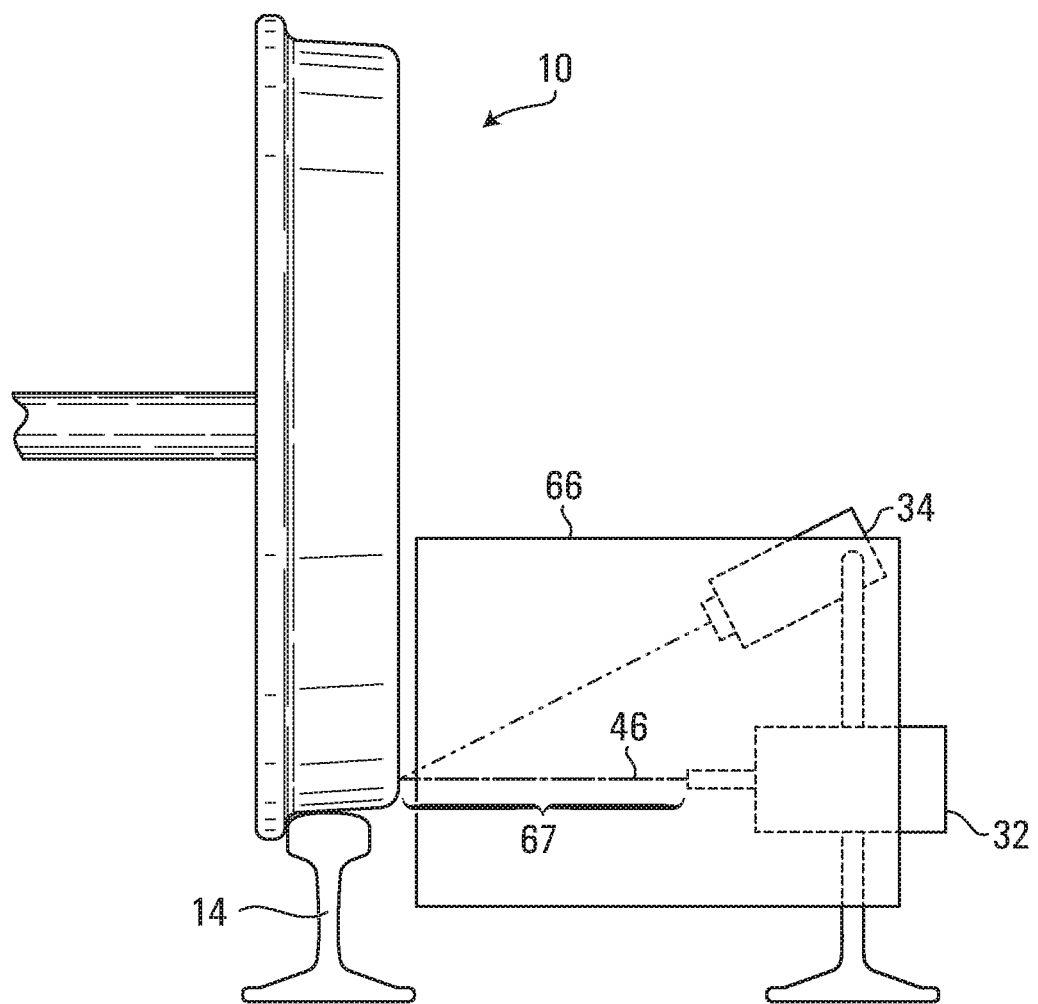
FIG. 16 shows an embodiment in which the wheel integrity monitoring system is provided with a protective cover to prevent debris from accumulating between the light source and the rail.
Figure 17:
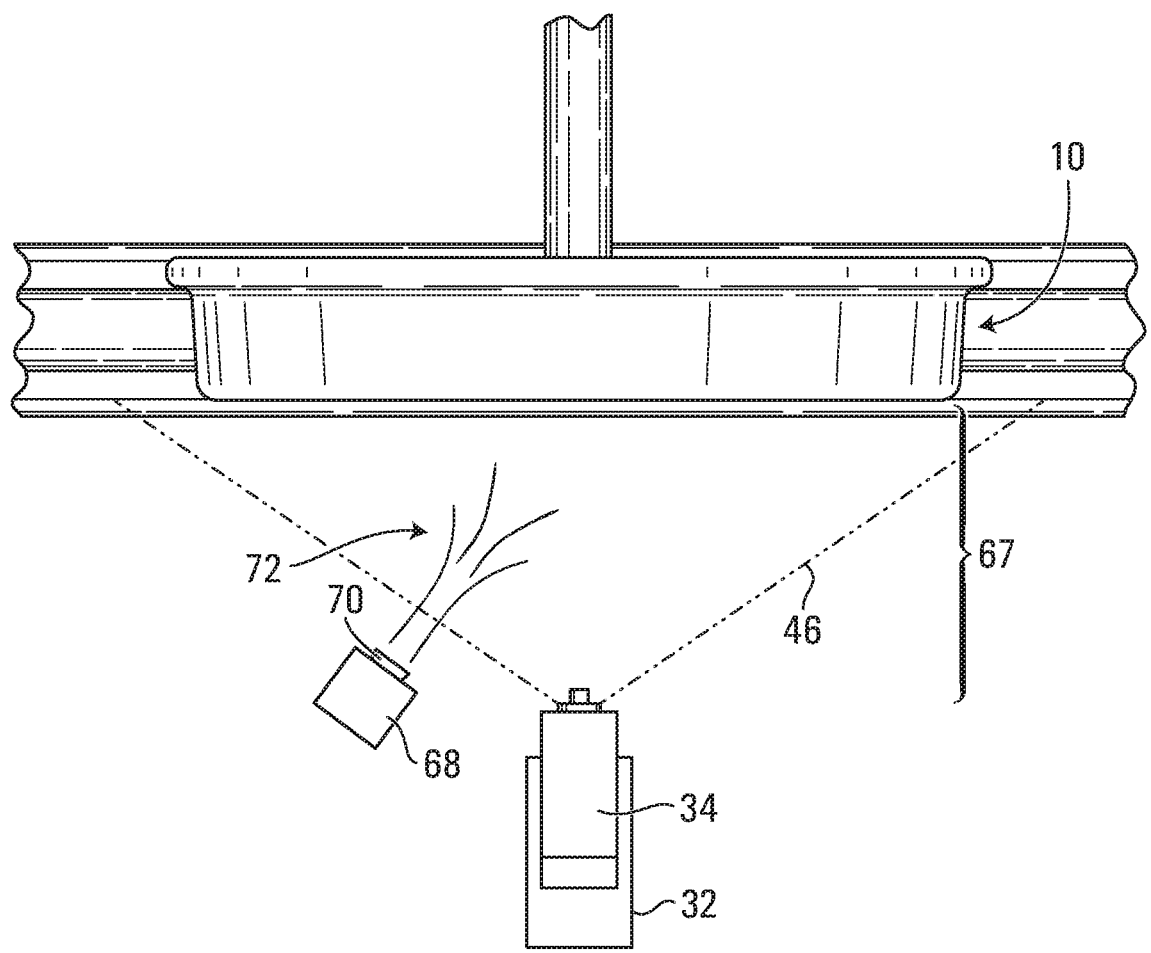
FIG. 17 shows a variant of FIG. 16 in which the cover is supplemented or replaced by an active debris clearing system.

In some embodiments, with additional reference to FIGS. 16 and 17, the wheel integrity monitoring system 30 is designed to prevent the accumulation of debris between the wayside light source 32 and/or the wayside light detector 34 and the wheel 10 to be inspected. More particularly, in one example of implementation, as shown in FIG. 16, the wheel integrity monitoring system 30 comprises a protective cover 66 extending between the wayside light source 32 and/or the wayside light detector 34 and the wheel 10 to be inspected. The cover 66 is provided with a pair of opposite and generally vertical sidewalls joined at their top by a horizontal top wall that shields a pathway 67 between the wayside light source 34 and/or the wayside light detector 36 and the wheel 10. In this fashion, the cover 66 is shaped such as to cover the pathway 67 from lateral sides and a top side thereof and prevent or otherwise minimize introduction of debris, such as snow into the pathway 67. To that end, the cover 66 is fixed to the ground and/or the wayside light source 32 and/or the wayside light detector 34.

Furthermore, in other embodiments, as shown in FIG. 17, in addition or as a substitute to the cover 66, the wheel integrity monitoring system 30 uses an active debris clearing system for actively clearing away debris from the pathway 67. More particularly, the wheel integrity monitoring system 30 comprises a debris remover 68 configured to remove debris from the pathway 67 when the wheel monitoring system 30 senses that debris are present in the pathway 67.

In one example of implementation, the debris remover 68 comprises an air nozzle 70 mounted adjacent the wayside light source 32 and/or the wayside light detector 34 and oriented towards the pathway 67. When the wheel integrity monitoring system 30 determines that there are debris in the pathway 67, the control unit 38 actuates the air nozzle 70 to cause it to eject a stream of air 72 towards the pathway 67 in order to clear it. The stream of air 72 may comprise hot air, which may be helpful to melt snow in winter conditions.

In other examples of implementation, the debris remover 68 may consist of a mechanical implement (e.g., an arm) that sweeps the pathway 67. In such examples, the mechanical implement may be actuated in any suitable way (e.g., via hydraulic or pneumatic actuators).

The wheel integrity monitoring system 30 can determine if there are debris in the pathway 67 by actuating the light source 32 and observing the image generated by the light detector 34, when no railway wheel is present to block the light beam 46. Since there is nothing to block the propagation of the light beam 46 (the light beam 46 passes freely over the rail 14), the image generated by the light detector 34 would show no reflections when the light path between the light source 32 and the rail 14 is completely clear. However, if there were any debris blocking the light beam 46, a reflection would be present in the image frame. If such reflection is identified, then the debris remover 68 is actuated. Note that for this operation to be performed, the width of the image frame generated by the light detector 34 must be sufficiently large in order to encompass the entirety of the light path between the light source 32 and the rail 14.

Accordingly, the system may periodically check for the presence of debris and if obstructions are found then the debris remover 68 is actuated. The system can also be designed to check how effective the debris remover 68 has been. After actuation of the debris remover 68, the light source 32 is actuated again to determine if the obstruction has been cleared away; if the obstruction is still present then the debris remover 68 is operated again. The cycle is repeated until the obstruction is completely cleared.

Figure 19:
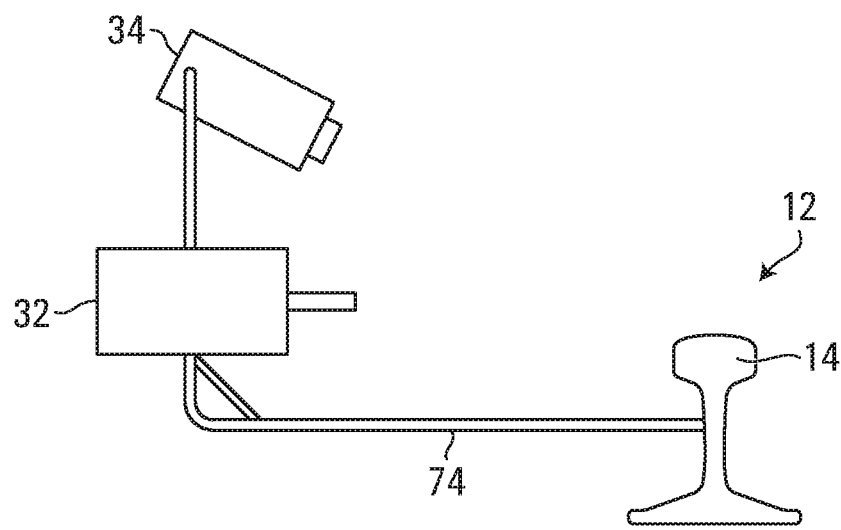
FIG. 19 is a side elevational view of an embodiment in which the wayside light source and the wayside light detector are mounted to the track.

The wayside light source 32 and the wayside light detector 34 are mounted to a support that is fixed to the ground adjacent the track 12. However, in the embodiment shown in FIG. 19, the wayside light source 32 and the wayside light detector 34 are instead mounted to the track 12 in order to move together with the track 12 (i.e., vertically) when the railcar 13 passes over the track 12. A heavy train may slightly sink the track 12 into the ground, in the order of half an inch or sometimes even less. However that may be sufficient to lose registration between the projection 43 and the rim portion 18 of the wheel 10. For instance, if the rail 14 is displaced downwardly sufficiently, the projection 43 may no longer paint the rim portion 18 of the wheel 10, rather it would paint the plate portion 16. By securing the wayside light source 32 and the wayside light detector 34 directly to the track 12, they move with the track 12 as the railcar 13 passes over it, such as to constantly maintain registration. To this effect, the wheel integrity monitoring system 30 comprises a support 74 that carries the wayside light source 32 and the wayside light detector 34 and is affixed to the track 12 (e.g., fastened to the rail 14). As shown, the support 74 has an L-shaped arm to which the wayside light source 32 and the wayside light detector 34 are affixed (e.g., fastened with mechanical fasteners, welding, or any suitable way).

Optionally, only the light source 32 can be affixed to directly to the track 12. When a relative motion is allowed to occur between the track 12 and the light detector 34, that relative motion may not be significant enough in the image frame such as to prevent the processing to be performed adequately.

Figure 20:
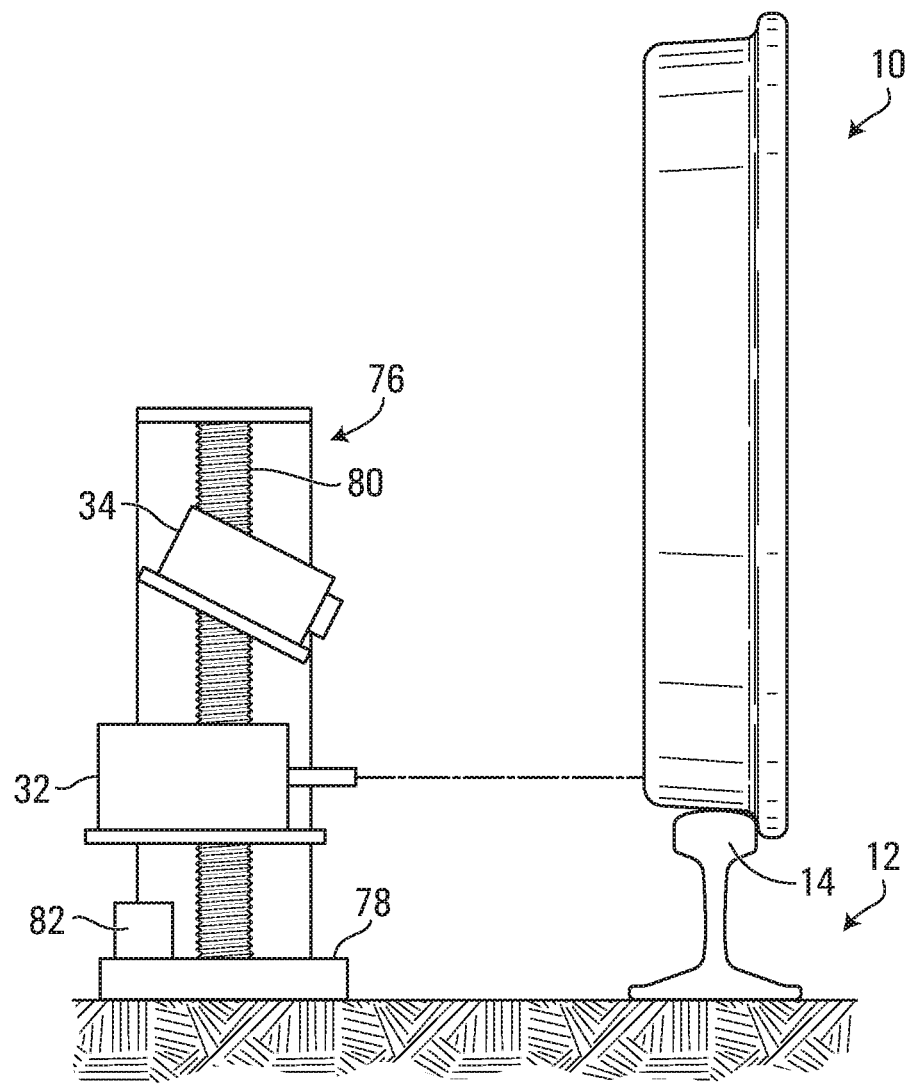
FIG. 20 is a side elevational view of an embodiment in which the wheel integrity monitoring system is self-aligning.

Furthermore, in some embodiments, as shown in FIG. 20, the wheel integrity monitoring system 30 comprises a self-aligning system 76 for aligning a position of at least one of the wayside light source 32 and the wayside light detector 34 relative to the rail 14. Such self-aligning feature may be useful to ensure that the registration between the light projection 43 and the top surface of the rail 14 is maintained at all times. It will be appreciated that the wheel integrity monitoring system 30 is exposed to the environment and may be subjected to physical shocks or other disturbances that can knock the light source 32 out of alignment, thus rendering the wheel integrity monitoring system 30 inoperative. The self-aligning feature can compensate when the light source 32 is no longer in alignment with the top surface of the rail 14 by readjusting the position of the light source 32 accordingly.

Figure 21:
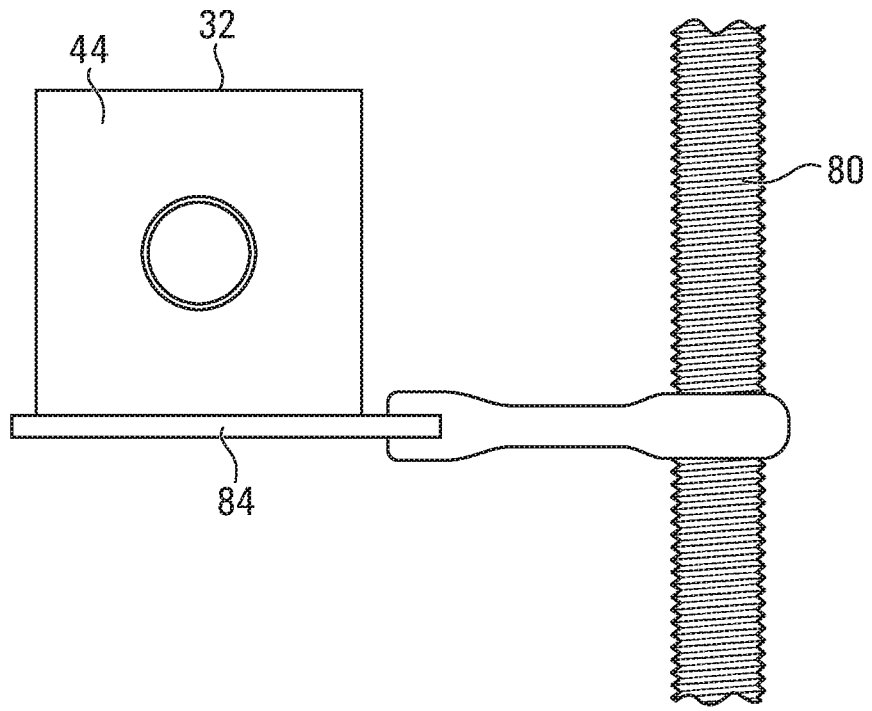
FIG. 21 is a front elevational view of the wayside light source supported by a lead screw in accordance with the embodiment of FIG. 20.

In the example of the self-aligning function shown, the wayside light source 32 and the wayside light detector 34 are supported by a support 78, which is affixed to the ground or the track 12. The support 78 comprises a lead screw 80 and a motor 82 for actuating the lead screw 80. Each of the wayside light source 32 and the wayside light detector 34 is mounted onto a support plate 84 that is in engagement with the lead screw 80, as shown in FIG. 21. As such, actuation of the lead screw 80 by the motor 82 causes motion of the support plate 84 and thus motion of the wayside light source 32 and the wayside light detector 34 in unison. Actuation of the lead screw 80 by the motor 82 is controlled by the control unit 38 which implements an aligning process in order to align the wayside light source 32 to project the light beam 46 at a correct position on the wheel 10.

Figure 22:
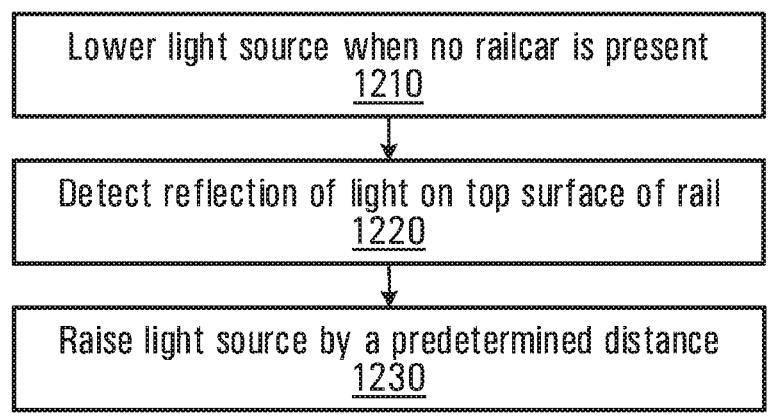
FIG. 22 is a flow diagram representation of an alignment process implemented by the control unit in accordance with the embodiment of FIG. 20.

An example of the alignment process will now be described with reference to FIG. 22.

At step 1210, when there is no detected presence of a railcar and/or a wheel, the control unit 38 actuates the motor 82 to lower the wayside light source 32 via the lead screw 80. At the same time, the wayside light detector 34 actively transmits image information of the inspection field 50 to the control unit 38.

At step 1220, when the wayside light detector 34 detects, based on the image information transmitted by the wayside light detector 34, that the light beam 46 is reflecting on a top surface of the rail 14 of the track 12, the control unit 38 stops the motor 82. At step 1230, the control unit 38 actuates the motor 82 to raise the wayside light source 32 via the lead screw 80 by a predetermined distance. For example, the predetermined distance may be one inch or any other suitable distance. This causes the light beam 46 projected by the wayside light source 32 to be positioned at its intended height to scan the rim portion 18 of the wheel 10.

In the embodiments described above, the light beam 46 projected by the wayside light source 32 has been described as being a laser beam or, in some cases, a light that is not visible to the naked eye (e.g., infrared light or ultraviolet light). However, in a variant, the wayside light source 32 may project light that is visible to the naked eye and that is not a laser beam. For instance, the wayside light source 32 may comprise an LED light source or an incandescent light source. In such a variant, the wayside light source 32 projects a bright light onto the wheel 10 at an angle from the bottom of the wheel 10 thus painting the rim portion 18 of the wheel 10 in light. Any interruptions detected in the light projected on the rim portion 18 can thus be interpreted as being a defect. In specific examples of implementation, the wheel integrity monitoring system 30 may comprise a covering to shield the wheel 10 from external light sources (e.g., sunlight) which may affect analysis of the light projected onto the wheel 10.

In another variant, the light beam 46 projected by the wayside light source 32 may be projected at any angle (e.g., rather than horizontally) onto the wheel 10. In such a variant, the control unit 38 may track a displacement of the railcar 13 and cause alignment of the wayside light source 32 with the wheel 10 when the wheel 10 passes by the wheel integrity monitoring system 30. This may be more complex but could have certain advantages in specific applications.

Certain additional elements that may be needed for the operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other differences between terms used herein and terms used in any document incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A railcar wheel integrity monitoring system, comprising:
   a. a light source for projecting a beam of light onto a wheel of a railcar travelling on a rail, the wheel having a wheel axis and a rim portion defining an annular front surface residing in a plane that is substantially vertical, the light source configured to produce an elongated pattern of light defining an elongated wheel scanning area, the elongated wheel scanning area extending along the rail and above the rail, the wheel scanning area having a horizontal extent such as to span a portion of a wheel forward of the wheel axis and a portion of the wheel rearward of the wheel axis in relation to a direction of movement of the wheel over the rail;
   b. a detector for sensing a reflection of the elongated pattern of light while the wheel is in the scanning area;
   c. a data processing device including an input for receiving a signal from the detector conveying beam reflection information, the data processing device configured to process the beam reflection information to detect a structural flaw in the annular front surface resulting from a loss of material creating a recess on the annular front surface;
   d. wherein the light source has a light beam projection axis and the detector has a viewing axis, the light source and the detector being positioned one with relation to the other such that an angle is defined in a vertical plane between the projection axis and the viewing axis, the angle being non-zero allowing the detector to detect a distortion of the elongated pattern produced by a structural flaw.

2. A system as defined in claim 1, wherein the angle is in the range from about 30 degrees to about 70 degrees.

3. A system as defined in claim 2, wherein the angle is in the range of about 40 degrees to about 60 degrees.

4. A system as defined in claim 3, wherein the angle is of about 45 degrees.

5. A system as defined in claim 1, wherein the light beam propagates along generally a horizontal axis from the light source toward the wheel.

6. A system as defined in claim 1, wherein the scanning area extends generally horizontally.

7. A system as defined in claim 6, wherein the scanning area has a length equal to or greater to a circumference of the wheel.

8. A system as defined in claim 1, wherein the data processing device is configured to distinguish between beam reflection information produced when the wheel has no structural flaw and beam reflection information produced when the wheel has a structural flaw.

9. A system as defined in claim 8, wherein the beam reflection information produced when the wheel has no structural flaw conveys a first reflection pattern and the beam reflection information produced when the wheel has a structural flaw conveys a second reflection pattern different from the first pattern, the control unit being configured to distinguish the first pattern from the second pattern.

10. A system as defined in claim 9, wherein the beam impinging the wheel creates a linear reflection.

11. A system as defined in claim 1, wherein the light is visible light.

12. A system as defined in claim 1, wherein the light is a non-visible light.

13. A system as defined in claim 1, wherein the data processing device is operative to store in a machine-readable storage inspection results of a wheel in association with information distinguishing the wheel among other wheels in a train.

14. A system as defined in claim 1, wherein the light source is configured for mounting to the rail in order to move vertically with the rail as a train vertically deflects the rail when travelling over the rail.

* * * * *